US008676795B1

(12) United States Patent
Durgin et al.

(10) Patent No.: US 8,676,795 B1
(45) Date of Patent: Mar. 18, 2014

(54) DYNAMIC VISUAL REPRESENTATION OF PHRASES

(75) Inventors: Cyrus J. Durgin, Seattle, WA (US); George N. Stathakopoulos, Seattle, WA (US); Dominique I. Brezinski, Seattle, WA (US); Emilia S. Buneci, Seattle, WA (US); Martin M. O'Reilly, Dublin (IE); Lane R. LaRue, Seattle, WA (US); Benjamin S. Kirzhner, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 66 days.

(21) Appl. No.: 13/198,410

(22) Filed: Aug. 4, 2011

(51) Int. Cl.
*G06F 7/02* (2006.01)
*G06F 17/30* (2006.01)

(52) U.S. Cl.
USPC ............ 707/730; 707/740; 707/750; 707/754

(58) Field of Classification Search
None
See application file for complete search history.

(56) References Cited

U.S. PATENT DOCUMENTS

| 2007/0282826 | A1* | 12/2007 | Hoeber et al. ..................... 707/5 |
| 2008/0231644 | A1* | 9/2008 | Lempel et al. ............... 345/689 |
| 2010/0235353 | A1* | 9/2010 | Warnock et al. .............. 707/723 |
| 2011/0131207 | A1* | 6/2011 | Jonsson ........................ 707/730 |
| 2012/0053927 | A1* | 3/2012 | Kulkarni et al. .................. 704/9 |
| 2012/0278341 | A1* | 11/2012 | ogilvy et al. .................. 707/749 |

* cited by examiner

*Primary Examiner* — Bruce Moser
(74) *Attorney, Agent, or Firm* — Lee & Hayes, PLLC

(57) ABSTRACT

A plurality of phrases may be extracted from documents associated with one or more document sources. The plurality of phrases may be filtered and processed to determine a frequency in which the plurality of phrases appear in the documents and/or a number of the document sources in which each phrase appears. A weight may be assigned to each of the phrases and, based at least in part on the assigned weight, a visual representation of the plurality of phrases may be presented. The visual representation may be dynamically updated based at least in part on an updated frequency or an updated total number of document sources associated with any one of the plurality of phrases.

25 Claims, 7 Drawing Sheets

DYNAMIC VISUAL REPRESENTATION OF PHRASES

BACKGROUND

Due to the number of sources in which data and/or other information is provided, disseminated, and otherwise available, it has become increasingly difficult to monitor these sources in an attempt to identify information of interest. Moreover, information sources, such as email providers, blogs, news sites, and social media networks (e.g., Twitter®, Facebook®, Flickr®, etc.), etc., may provide a wealth of constantly changing information. As a result of the growing number of these sources, and the vast amount of information generated by these sources, existing systems are unable to efficiently identify specific information on an ongoing basis.

For instance, existing methods may collect data relating to the performance, latency, and/or customer behavior/feedback associated with a system and then utilize this data to develop new features for the system and/or to correct identified problems of the system. More particularly, the collection of data and actions taken based on this data may be automated, such as by writing software code. In the above example, the software code may be written so that the software performs some type of function in response to one or more instructions. However, since the author of the software code is generally aware of the type of information being sought, the foregoing methods may be limited to identifying and collecting data that is expected to be available. Therefore, because it is very difficult, if not impossible, to know what type of information or documents will be provided via the information sources noted above, existing systems may be unable to detect what topics and content are currently being mentioned and/or discussed on these information sources.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
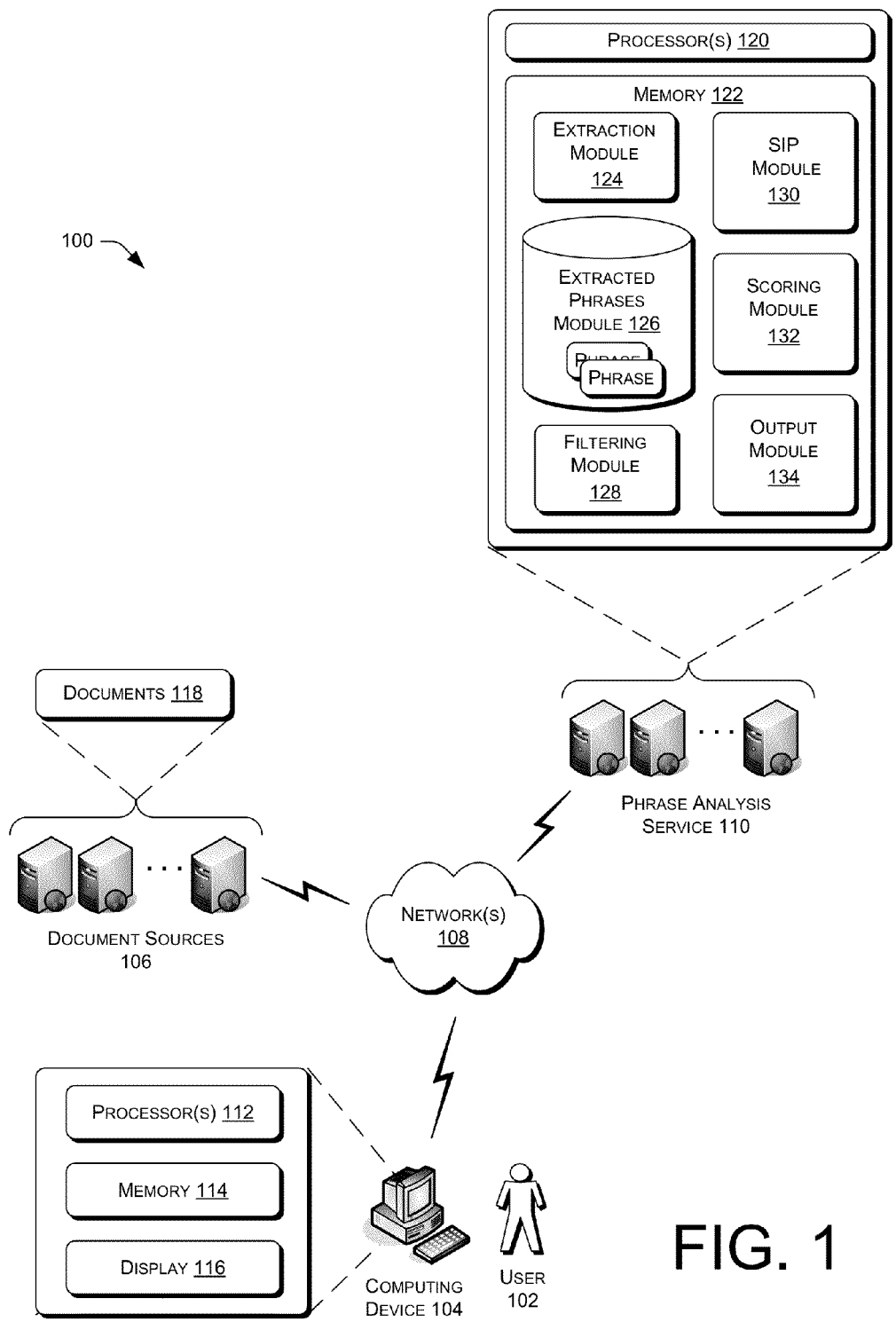
FIG. 1 is a diagram showing an example system including a user, a computing device, one or more document sources, one or more networks, and a phrase analysis service. In this system, phrases from documents associated with the document sources may be scored and visually presented to the user.

This disclosure describes processing natural language documents from one or more sources and visually representing the phrases to a user based at least in part on the frequency in which the phrases appear within documents associated with the one or more sources and/or the number of sources in which those documents appear. In particular, phrases within documents associated with one or more document sources may be extracted and filtered such that the phrases are likely to represent topics and/or the content of their respective documents. The filtered phrases may be processed to determine a frequency at which the phrases appear in the documents and the processed documents are then are weighted (e.g., scored) accordingly. Further, the filtered phrase may also be processed to determine the frequency at which the filtered phrases appear in different document sources. Once the phrases are processed and weighted, a visual representation of the subset of phrases may be output to a computing device whereby a user interface may visually present the phrases to a user. Optionally, the table depicting information associated with the represented phrases may also be displayed either independently or in conjunction with the visual representation of the phrases.

In various embodiments, a system may utilize one or more algorithms to process documents from a variety of sources in order to extract meaningful phrases (e.g., nouns, verbs, adjectives, etc.) from these documents. The phrases may then be weighted based at least in part on their respective importance. In some embodiments, the importance of a particular phrase may be determined by the frequency in which that phrase appears in a single document, multiple documents from a particular source, each of the documents within that source, and/or each of the documents associated with multiple sources. The importance of a phrase may also depend upon the number of document sources in which that phrase appears. Moreover, the system may render the phrases into a document (e.g., an HTML document) for display to a user via a user interface (e.g., web browser). In certain embodiments, each phrase within the visual representation may be emphasized (e.g., variations in size, font, color, etc., of each phrase) to indicate an overall frequency of the phrase among the document sources and/or the number of documents sources in which the phrase appears. In addition, a table indicating this information, such as identification of the phrases and their corresponding weights, may be displayed to the user in a phrase table.

Furthermore, any type and/or source of information that can be organized into one or more documents may be processed in the manner described above. Examples of document sources include e-mail messages, blog posts, news articles, social media information (Twitter® tweets, Facebook® posts and/or comments, etc.), and any other source that may create or provide access to natural language documents. In various embodiments, each document source may be periodically polled or continuously monitored to determine the existence of new documents and, as additional phrase extracted and processed, the weight of each phrase may change.

For instance, since the weight of phrases may depend on their frequency within the documents, due to the presence of new phrases or additional instances of previously identified phrases, the weights associated with the new phrases and the existing phrases may be updated. As weights for new phrases are calculated and as the scores for the existing phrases are periodically updated, the representation of the phrases (e.g., text, images, symbols, etc.) within the visual representation may also change (e.g., increase/decrease in size, change colors, font variation etc.). As a result, the visual representation of the phrases identified in the documents may constantly evolve and change based on the frequency in which the phrases appear in those documents and the documents sources associated therewith. That is, the systems described herein may display a snapshot of what phrases are currently trending (e.g., being mentioned, described, and/or discussed) amongst a multitude of different information sources at any particular point in time.

The discussion begins with a section, entitled "Example Environment," describing a system for providing a visual representation of phrases extracted from various document sources. The discussion then moves to a "Phrase Analysis Service" section that describes components and functions associated with the phrase analysis service. Subsequently, a "Providing Phrase Data" section describes the generation and production of phrase data. Next, the discussion includes a section, entitled "Phrase Extraction," that describes a system for processing phrases extracted from documents associated with various document sources. The discussion then moves on to a "Visual Representation of Phrase Data" section that describes a system for visually representing the phrases based at least in part on weights assigned thereto. The discussion then includes a section, entitled "Example Processes," that illustrates and describes example processes for implementing the described techniques. Lastly, the discussion includes a brief "Conclusion".

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

FIG. 1 illustrates an example system 100 for extracting phrases from one or more documents and visually representing those phrases based at least in part on a frequency in which those phrases appear in the documents and/or a frequency in which those phrases appear in different sources associated with the documents. More particularly, the system 100 includes a user 102, a computing device 104, one or more document sources 106, one or more network(s) 108, and a phrase analysis service 110. In various embodiments, the user 102 may operate the computing device 104, which includes one or more processor(s) 112, a memory 114, and a display 116. Furthermore, each of the document sources 106 includes and/or provides one or more documents 118. The phrase analysis service 110 also includes one or more processor(s) 120 and a memory 122, which includes an extraction module 124, an extracted phrase module 126, a filtering module 128, a SIP (Statistically Improbable Phrase) module 130, a scoring module 132, and an output module 134.

In various embodiments, the phrase analysis service 110 may monitor and/or may poll one or more document sources 106 to identify documents 118 associated with those document sources 106. From the identified documents 118, the phrase analysis service 110 may extract phrases and filter those phrases to determine meaningful words that substantively represent topics and/or the content of those documents 118. The phrase analysis service may then process the filtered phrases to determine which phrases are trending (e.g., being commonly referred to) at a particular point in time. To determine which phrases are currently trending, the phrase analysis service 110 may determine how frequently the phrases occur in the documents 118. The phrase analysis service 110 may also determine the number of document sources 106 in which each phrase appears. For instance, for a particular phrase, the system 100 may determine the number of times that the phrase has been mentioned amongst the documents 118 and document sources 106 and the number of different document sources 106 in which that phrase appears.

In further embodiments, for the phrases that appear most frequently in the documents 118, those phrases may be visually represented (e.g., via a web browser) such that a user may determine which phrases are trending at a particular point time. To determine which phrases have been most commonly referred to, and/or to determine which phrases have appeared in the greatest number document sources 106, the visual representation of each phrase may vary in appearance. For instance, each phrase may vary in size, font, color, or in any other manner, to indicate the importance of that particular phrase. By viewing this visual representation, the user 102 may determine which phrases are currently being mentioned and/or discussed more than other phrases in the documents 118 and the various document sources 106 (e.g., blog posts, news articles, e-mail messages, information associated with social media applications, etc.).

In some embodiments, the user 102 may operate the computing device 104 to perform various functions associated with the computing device 104, which may include the one or more processor(s) 112, the memory 114, and the display 116. Furthermore, the computing device 104 may receive the visual representation of the processed phrases and display those to the user 102. The computing device 104 may be a cellular phone, a personal digital assistant (PDA), a laptop computer, a tablet device, an electronic book (e-Book), or any other computing device 104. Moreover, the user 102 may use the computing device 104 to access the network 108. For instance, the user 102 may utilize the computing device 104 to access and navigate between one or more web pages or web documents that may be of interest to the user 102, such as the visual representation of the phrases and the corresponding phrase table, as described above. The computing device 104 shown in FIG. 1 is only one example of a computing device and is not intended to suggest any limitation as to the scope of use or functionality of any computing device utilized to perform the processes and/or procedures described herein.

The processor(s) 112 of the computing device 104 may execute one or more modules and/or processes to cause the computing device 104 to perform a variety of functions, as set forth above and explained in further detail in the following disclosure. In some embodiments, the processor(s) 112 may include a central processing unit (CPU), a graphics processing unit (GPU), both CPU and GPU, or other processing units or components known in the art. For instance, the processor(s) 112 may allow the visual representation of phrases output by the phrase analysis service 110 to be displayed to the user 102. Additionally, each of the processor(s) 112 may possess its own local memory, which also may store program modules, program data, and/or one or more operating systems.

In at least one configuration, the memory 114 of the computing device 104 may include any components that may be used to display a visual representation of phrases processed by the phrase analysis service 110. Depending on the exact configuration and type of the computing device 104, the memory 114 may also include volatile memory (such as RAM), non-volatile memory (such as ROM, flash memory, miniature hard drive, memory card, or the like) or some combination thereof.

In various embodiments, the computing device 104 may also have input device(s) such as a keyboard, a mouse, a pen, a voice input device, a touch input device, etc. The computing device 104 may also include the display 116 and other output device(s), such as speakers, a printer, etc. The user 102 may utilize the foregoing features to interact with the computing device 102 and/or the phrase analysis service 110 via the network 108. More particularly, the display 116 of the computing device 104 may include any type of display known in the art that is configured to present (e.g., display) information to the user 102. For instance, the display 116 may be a monitor communicatively coupled to the computing device 104 such that when the computing device 104 receives data from the phrase analysis service 110 via the network(s) 108, the computing device 104 may render this data for presentation to the user 102 via the display 116.

In further embodiments, the document sources 106 may include any type of information source that contains, distributes, and/or provides access to natural language documents (e.g., the documents 118). That is, the document sources 106 may include any database, website, and/or any other source that is associated with electronic information. For instance, the document sources 106 may include any source that generates, transmits, provides access to, or is otherwise associated with the documents 118. Moreover, the document sources 106 may store or archive the documents 118 and may also generate, transmit, and/or provide access to new documents 118 when the new documents 118 are received or generated. In various embodiments, the documents 118 may include blog posts, news articles, news alerts, email messages, instant messages, word-processing documents, posts or comments associated with any social media site (e.g., Facebook®, Twitter®, etc.), and any other type of natural language document. Moreover, the phrase analysis service 110 may, at any time, access the documents 118 via the network(s) 108 and extract phrases from within the documents 118.

In some embodiments, the network(s) 108 may be any type of network known in the art, such as the Internet. Moreover, the computing device 104, the document sources 106, and the phrase analysis server 110 may communicatively couple to the network 108 in any manner, such as by a wired or wireless connection. The network(s) 108 may also facilitate communication between the computing device 104, the document sources 106, and/or the phrase analysis server 110 and also allow for the transfer of data therebetween. For instance, the phrase analysis service 110 may access the document sources 108 and the documents 118 via the network(s) 106 and also extract phrases from the documents 118 utilizing the network(s) 108. The phrase analysis server 110 may also output data, such as the scored phrase data, that may be rendered by the computing device 104 and/or presented to the user 102 using the display 116 of the computing device 104.

In addition, and as mentioned previously, the phrase analysis service 110 may include one or more processor(s) 120 and a memory 122, which may include the extraction module 124, the extracted phrases module 126, the filtering module 128, the SIP module 130, the scoring module 132, and the output module 134. The phrase analysis service 110 may also include additional components not listed above that perform any function associated with the phrase analysis service 110. The phrase analysis service 110 may be a server or may be stored on a server, such as a cloud server, for example. Moreover, in some embodiments, the phrase analysis service 110 may access the document sources 106 for the purpose of extracting one or more phrases from the documents 118 associated with the document sources 106. These documents 118 may include documents 118 that were existing at the document sources 106 or documents 118 that have recently become available. Furthermore, the phrase analysis service 110 may periodically monitor, poll, and/or access each document source 106 to determine whether new or additional documents 118 are available. If so, the phrase analysis service 110 may access those new documents 118.

Upon accessing the documents 118 from the multiple document sources 106, the extraction module 124 of the phrase analysis service 110 may extract phrases from the documents 118. In various embodiments, each phrase may include one word or multiple words with each word having any number of characters. Moreover, each word may be a noun, a verb, an adjective, and/or any other type of speech identified in the documents 118 (e.g., pronouns, adverbs, etc.). In some embodiments, the phrases may include one or more words that relate to content and/or describe topics corresponding to the documents 118 from which those phrases are extracted. Furthermore, any number of phrases may be extracted from the documents 118 and the number of phrases that are extracted may depend upon the number of document sources 106 accessed by the phrase analysis service 110 and the number of accessible documents 118 associated with each document source 106. The phrases may be extracted from any documents 118 associated with a particular document source 106, such as archived documents, documents that are currently available at the document source 106, and/or newer and recently released documents 118.

Once the phrases are extracted from the documents 118 associated with the document sources 106, the phrase analysis service 110 may store the extracted documents 118 in the extracted phrases module 126. As the extraction module 124 continues to extract additional phrases from the documents 118, more extracted phrases may be stored in the extracted phrases module 126. The extracted phrases may remain in the extracted phrases module 126 until processed or various phrases within the extracted phrase module 126 may be periodically deleted or removed.

In other embodiments, the filtering module 128 may filter the extracted phrases stored in the extracted phrases module 126. Moreover, since the phrases extracted by the extraction module 124 may include any type and/or number of words, the extracted phrases may include phrases that do not convey meaningful information. For instance, phrases that do not describe the content or topics relating to a particular document 118, phrases in a foreign language (e.g., not in the English language), and/or other phrases that do not otherwise convey meaningful content may be filtered out such that the number of extracted phrases is reduced. The filtering module 128 may utilize one or more rules to remove such phrases prior to the extracted phrases being processed by the SIP module 130, which will be described in detail with respect to at least FIG. 2. In some embodiments, the filtering module 128 may decrease (e.g., filter out) the number of extracted phrases in order to reduce the number of extracted phrases that are to be processed by the SIP module 130, which may also reduce the amount of time and resources used to process the extracted phrases.

Therefore, the filtering module 128 may filter the extracted phrases to eliminate highly unique or other phrases that are unlikely to accurately describe topics and/or content of the documents 118 in which those phrases were extracted. Furthermore, the filtering module 128 may also remove phrases that include more common words (e.g., and, about, regarding, etc.) and grammatical terms that are also unlikely to convey the subject matter being mentioned and/or described in those documents 118. As a result, once the extracted phrases are filtered by the filtering module 128, there may be a higher likelihood that the remaining extracted phrases include phrases that are sufficiently unique to substantively describe the document 118 from which those phrases were previously extracted.

The phrases that have been filtered by the filtering module 130 may then be processed by the SIP module 130. In some embodiments, the SIP module 130 may process the filtered phrases to determine SIPs (statistically improbable phrases) for the documents 118 associated with the filtered phrases. For the purpose of this discussion, SIPs may refer to the most distinctive phrases in the text of each of the documents 118 that appear in a higher frequency than in other documents 118. To identify whether each extracted phrase is a SIP, the SIP module 130 may determine the number of times the phrase appears in the text of the document 118 in which it was extracted, versus the frequency in which that phrase appears in other documents 118. If the phrase appears more frequently in a particular document 118 relative to the other documents 118, that phrase may be referred to as a SIP. Moreover, the phrases that are determined to be SIPs are not necessarily improbable within a particular document 118, but they may be improbable relative to the other documents 118. For instance, the phrase "laptop computer" may appear in a particular document 118 a great number of times but may rarely be present in other documents 118. As a result, this phrase would likely be a SIP with respect to this particular document 118.

In various embodiments, the SIP module 130 may employ one more algorithms that are configured to identify phrases that appear in a particular document 118 at a higher frequency or concentration than in other documents 118. Theses phrases may also appear in other documents 118 but at a lower frequency or concentration than the particular document 118 mentioned above. That is, the SIP module 130 may determine how frequently different phrases appear in each document 118. The SIP module 130 may determine these frequencies or concentrations by generating statistics relating to phrases that appear in a first document 118 much more than those phrases appear in a second document 118 and/or all other documents 118.

As a result, for each filtered phrase, the SIP module 130 may measure the relative frequency by which the phrase appears in a first document 118 compared to other documents 118. Since this phrase appears more frequently in the first document 118, the phrase analysis service 110 may determine that the first document 118 is more likely to contain content and/or topics relating to this phrase than the other documents 118 in which that phrase appears less frequently. For instance, assume that the phrase "laptop computer" appears in a first document 118 (e.g., an email message, a news article, a blog post, etc.) seventeen times whereas this phrase appears in the other documents 118 (e.g., an email message, a news article, a blog post, etc.) no more than five times. Since the concentration of the phrase "laptop computer" is much higher in the first document 118, there may be a much higher likelihood that the first document 118 relates to laptop computers. Although the other documents may mention the phrase "laptop computers" one or more times, because this phrase is mentioned at a much lower frequency, there may be a lesser likelihood that the topic and/or content of the other documents 118 is primarily related to laptop computers.

Therefore, the SIP module 130 may determine a frequency of phrases in a particular document 118 as compared to a subset of other documents 118, or all other documents 118 associated with the document sources 106. The SIP module 130 may also measure the relative frequency of phrases from one document source 106 to another document source 106. That is, for each filtered phrase, the SIP module 130 may determine whether a particular phrase appears within documents 118 from one document source 106 (e.g., email messages) or from multiple document sources 106 (e.g., email messages, blogs, news sites, social media sites, etc.). For instance, the SIP module 130 may consider each of the documents 118 within the multiple document sources 106 and determine that a particular phrase appears in documents 118 across multiple document sources 118 or appears in documents 118 within only one document source 106. Therefore, the SIP module 130 may apply its corresponding algorithm(s) to multiple document sources 106 to determine whether a particular phrase is being mentioned frequently but within only one document source 106 or whether this phrase is being discussed and described more generally across multiple sources of information.

Accordingly, in various embodiments, the SIP module 130 may process the filtered phrases to determine (1) a frequency in which phrases occur within a particular document 118, multiple documents 118 within a particular document source 106, and/or documents 118 from multiple document sources 118; and (2) the number of document sources 106 in which each phrase appears. In other words, the SIP module 130 may process each phrase to determine the frequency in which the phrases appear in the documents 118 in which they were extracted. The SIP module 130 may then process each phrase to determine the frequency in which the phrases appear within documents 118 from other document sources 106.

As stated above, SIPs may refer to unusual but frequently occurring phrases that appear in a document 118 relative to other documents 118. The SIP module 130 may attempt to identify and pare down the SIP phrases so that the number of SIP phrases within the documents 118 may be determined. To accomplish this, the SIP module 130 may determine the SIP phrases for a particular document 118 and then determine the frequency that these SIP phrases occur in other places, such as other documents 118 within a particular document source 106 and/or documents 118 within multiple different document sources 106. The SIP module 130 may also filter out SIP phrases that are unlikely to convey meaningful content or that are unlikely to relate to a topic and/or content of a document 118. As the SIP module 130 continues to process the newly extracted and filtered phrases, the phrase analysis service 110 may identify trends and/or velocity changes of the SIP phrases. That is, the phrase analysis service 110 may be able to determine whether phrases are appearing more or less frequently across a variety of different document sources 106, which may indicate the importance and/or popularity of those phrases at a particular point in time.

In some embodiments, the SIP module 130 may utilize a SIP algorithm. However, the SIP module 130 may also utilize any other algorithm, method, and or technique to determine a frequency or concentration in which a phrase appears in different documents 118 and document sources 106.

Once the extracted and filtered phrases are processed by the SIP module 130, the scoring module 132 may assign a weight (e.g., score) or multiple weights to some or all of the SIP phrases. For the purposes of this discussion, the terms "score" and "weight", and any variations thereof, may be used interchangeably. The weight of each SIP phrase may be based at least in part on a frequency in which the phrases appear in the documents 118 extracted by the extraction module 124 and/or the number of documents sources 106 in which each phrase appears. In various embodiments, phrases that appear more frequently in the extracted documents 118 and/or that appear in a greater number of document sources 106 may be assigned a greater weight. Moreover, SIP phrases having a higher weight may indicate a relative importance of the phrase. For instance, a phrase having a higher weight may indicate that the phrase is being mentioned and/or discussed at a higher frequency than other phrases, possibly meaning that a topic or content relating to this phrase is becoming more relevant. Furthermore, if the weight of the phrase represents that the phrase is also being mentioned and/or discussed in multiple information sources, this may be further evidence that topics relating to this phrase are being more commonly mentioned and/or discussed by various individuals and/or entities. In addition, as additional phrases are extracted, filtered, and then processed by the SIP module 130, the new phrases may be weighted against the phrases that have already been processed and weighted. Since the additional phrases may increase the frequency of existing phrases, the weights associated with the existing phrases may periodically change. For example, if the phrase "laptop computer" has already been assigned a weight, this phrase appearing in more recently available documents 118 may cause the weight to increase.

In further embodiments, after the phrases are weighted or scored by the scoring module 132, the output module 134 may output the scored phrase data to the computing device 104 via the network(s) 108. Alternatively, the output module may output a visual representation of the scored phrase data and optionally, a table including the scored phrase data, to the computing device 104 for presentation via the display 116. The visual representation of the scored phrases may take any form, and will be discussed in additional detail with respect to FIGS. 4 and 5. Utilizing the display 116 of the computing device 104, the user 102 may access a visual representation of the processed phrases, which may indicate trends relating to how frequently various phrases are being mentioned and/or discussed across a multitude of information sources.

The system 100 shown in FIG. 1 and described above may be utilized in a number of different ways. To illustrate, the visual representation of the processed phrases and/or the corresponding phrase table may be utilized in the context of information security. For instance, the system 100 may be used to identify and prevent potential security risks associated with an entity or a website associated with the entity, such as identity theft, denial of service attacks, the implementation of viruses or malware, etc. In some embodiments, an entity may utilize the system 100, and the phrase analysis service 110 in particular, to monitor information sources that are likely to relate to such security risks. Furthermore, the phrase analysis service 100 may periodically monitor these sources, such as by extracting phrases from documents 118 associated therewith, to determine a level or risk corresponding to the entity. As a result, provided that one or more information sources mentions and/or discusses an attack or security breach associated with the entity, the visual representation of the phrase data generated by the phrase analysis server 110 may indicate that these phrases are being mentioned more frequently. For instance, due to the increase in frequency of these phrases, the weights associated with these phrases may increase and/or the representation of these phrases within the visual representation may vary to indicate that the phrases are in fact appearing more frequently in one or more information sources. In response, the entity may take affirmative or corrective action to prevent or remedy the potential or existing security breach.

Phrase Analysis Service

Figure 2:
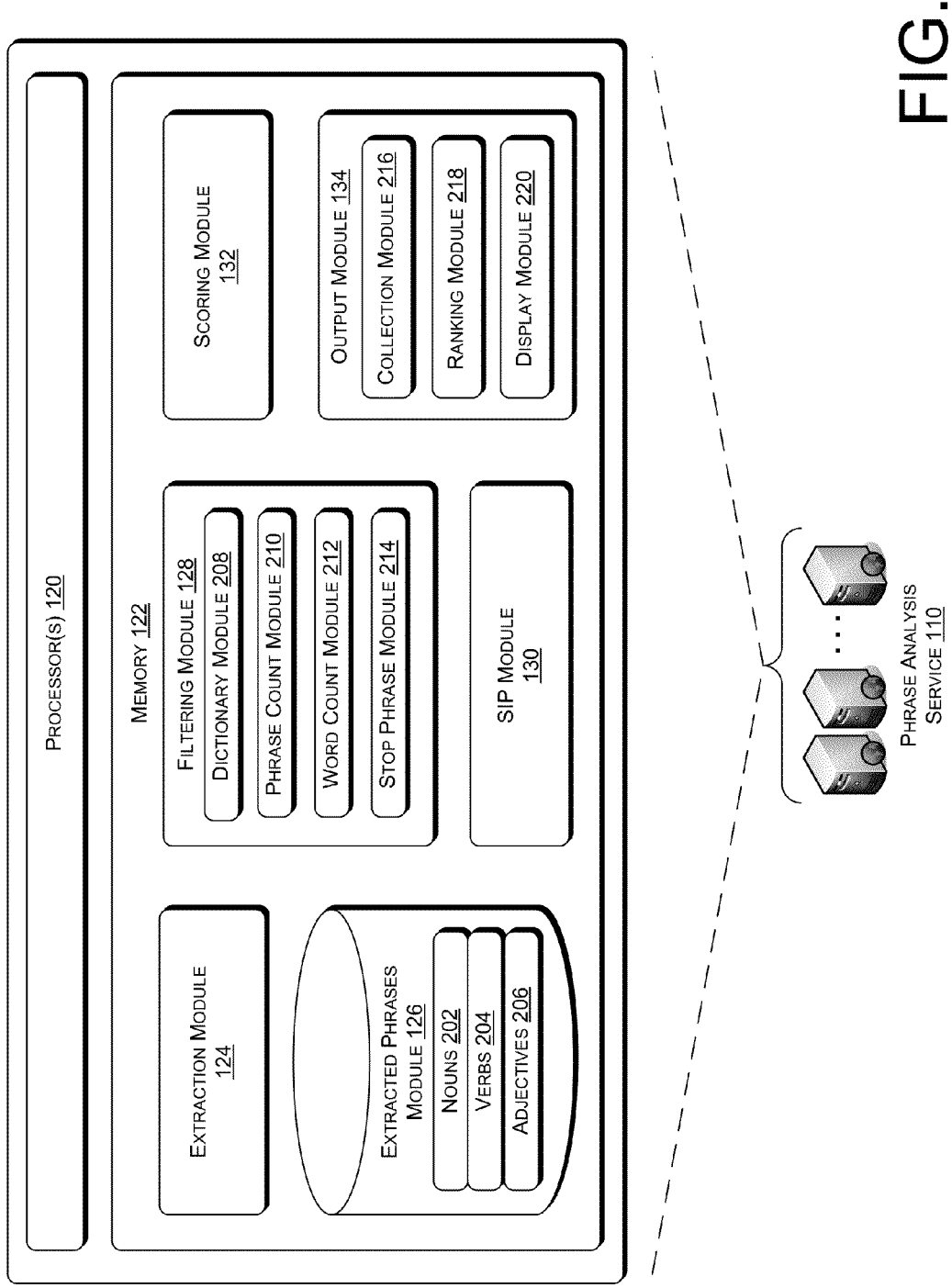
FIG. 2 is a diagram showing components associated with a phrase analysis service that extract, process, score, and output phrases identified in documents from one or more document sources.

FIG. 2 illustrates a diagram showing various components and/or modules of the phrase analysis service 110. In various embodiments, the phrase analysis service 110 may include the one or more processor(s) 120 and the memory 122, which may include the extraction module 124, the extracted phrases module 126, the filtering module 128, the SIP module 130, the scoring module 132, and the output module 134, as shown in FIGS. 1 and 2. The foregoing modules may be the same or different from the corresponding modules illustrated in FIG. 1. Moreover, the extracted phrases module 126 may store phrases that include nouns 202, verbs 204, and adjectives 206 and the filtering module 128 may include a dictionary module 208, a phrase count module 210, a word count module 212, and a stop phrase module 214. Furthermore, the output module 134 may include a collection module 216, a ranking module 218, and a display module 220.

As mentioned previously with respect to FIG. 1, the phrase analysis service 110 may extract phrases within the documents 118 from a variety of the document sources 106. The extracted phrases may be filtered (e.g., reduced in number) so that the remaining phrases are more likely to represent meaningful content about the documents 118 in which the phrases are extracted. Moreover, the filtered phrases may then be processed to determine a relative frequency that those phrases occur in the documents 118 and/or to determine the number of document sources 106 in which those phrases appear. Based on these frequencies, the phrases may be weighted and visually represented to the user 102. The visual representation of the phrases may indicate which phrases and, therefore, which topics and/or content are trending or important at a particular point in time. Moreover, as the phrase analysis server 110 continues to monitor the document sources 106, the representations of the phrases may change to indicate increases or decreases in the frequencies with which those phrases are being mentioned and/or discussed.

In various embodiments, the extraction module 124 may extract phrases from one or more documents 118 (e.g., e-mail messages, blog posts, news articles, etc.) from a variety of document sources 106 (e-mail server, blog sites, news sites, etc.) and may store those phrases in the extracted phrases module 126. The phrases may include one or any combination of words, letters, characters, and/or other symbols. Moreover the phrases may be one or any combination of nouns 202, verbs 204, and/or adjectives 206. In various embodiments, the phrase analysis service 110 may be configured such that only nouns 202, verbs 204, or adjectives 206 may be extracted as phrases. Moreover, the phrase analysis service 110 may also select any combination of nouns 202, verbs 204, and adjectives 206 as phrases.

As described with respect to FIG. 1, the filtering module 128 may apply one or more rules in order to filter (e.g., reduce in number) the extracted phrases. Since various phrases may not substantively reflect the topic(s) and/or content associated with the document 118 in which the phrase was extracted, it may conserve time and/or resources to refrain from processing such phrases. Accordingly, the dictionary module 208, the phrase count module 210, the word count module 212, and the stop phrase module 214 of the filtering module 128 may be used to filter the extracted phrases.

For instance, the dictionary module 208 may be applied to help make sure that each phrase includes at least one word that appears in an English language dictionary. In various embodiments, the dictionary module 208 may specify that the dictionary being utilized should include at least a predetermined number of words (e.g., 75,000), which may be any number of words. This may ensure that at least one word of a particular phrase is an established word in the English language and, therefore, is more likely to appear in other documents 118. If a particular phrase does not include at least one word in a dictionary having a predetermined number of words, that particular phrase may be removed and not processed by the SIP module 130. Otherwise, that phrase may remain and be addressed by the remaining modules of the filtering module 128.

In further embodiments, the phrase count module 210 of the filtering module 128 may determine whether each phrase is at least a predetermined number of words in length (e.g., two words) and/or no more than a predetermined number of words length (e.g., four words). The phrase count module 210 may help ensure that the phrase does not contain too few words, thereby allowing the phrase to appear in too great a number of documents 118 and/or document sources 106. Furthermore, the phrase count module 210 may help ensure that the phrase does not contain too many words, which may avoid the phrase only appearing in a limited number of documents 118 and/or document sources 106. In various embodiments, any number of words may be specified and if the amount of words in a particular phrase does not fall within the specified length parameters, that phrase may be removed.

The word count module 212 of the filtering module 128 may determine whether each phrase includes any words that are greater than predetermined number of characters in length (e.g., fourteen). In example embodiments, the predetermined number may be any number. Moreover, if at least one word in a particular phrase exceeds this predetermined number, the phrase may be removed and not subsequently processed by the SIP module 130.

In addition, the stop phrase module 214 may determine whether the phrase includes any words that may be classified as "stop phrases" or "stop words." For the purpose or this disclose, stop phrases or stop words may refer to words and/or characters that indicate a stopping point in a document 118. For instance, a stop phrase may indicate the end of a sentence, the end of a paragraph, the end of a page, or the end of the document 118. The stop phrases may also refer to phrases that begin or end with a stop word, such as "and", "it", "or", etc., or numbers. As a result, these stop phrases may be less likely to convey meaningful content and, therefore, may be less likely to represent topics and/or content associated with the document 118 in which the phrase was extracted. Furthermore, if the stop phrase module 214 determines that a particular phrase includes one or more stop phrases, the filtering module 128 may remove that phrase. In further embodiments, the filtering module 128 may include any number of additional modules that further filter the extracted phrases.

Once the extracted phrases have been filtered by the filtering module 128, the filtered phrases may then be processed by the SIP module 130. As mentioned previously with respect to FIG. 1, for each phrase, the SIP module 130 may determine a frequency in which the phrase appears in the particular document 118 in which it was extracted, a frequency in which the phrase appears within a particular document source 106, and/or an overall frequency in which the phrase appears across each of the documents 118 from the one or more document sources 106. In addition, for each phrase, the SIP module 130 may determine the number of different document sources 106 in which that phrase appears. In various embodiments, the importance or relevance of a certain phrase at a particular point in time may be indicated by how frequently that the phrase is being mentioned and/or discussed with respect to one or more sources of information (e.g., blogs, news sites, social media sites, e-mail messages, etc.).

Following processing at the SIP module 130, the SIP phrases may be weighted or scored by the scoring module 132. In some embodiments, the scoring module 132 may assign a weight to each phrase based on their respective frequency determined by the SIP module 130. For instance, phrases that appear more frequently across the document sources 106 and/or that appear in a greater number of different document sources 106 may be weighted higher than other phrases. Furthermore, the weights associated with the phrases may constantly, or periodically, be updated. For example, as additional instances of existing phrases are extracted and processed, the weights for those phrases may be increased. On the contrary, the weight for existing phrases that have not recently appeared in the various document sources 106 may remain the same. Further, newly identified phrases may be weighted and when those phrases become more frequent, the weights associated with the newly identified phrases may surpass those of existing phrases. As a result, weighting of the phrases allows the phrase analysis service 110 to determine which phrases are most commonly being referred to or discussed within the monitored document sources 106 at any particular point in time.

As illustrated in FIG. 2, the output module 134 includes the collection module 216, the ranking module 218, and the display module 220. In some embodiments, the output module 134 may output the weighted phrases to the computing device 104. More particularly, the output module 134 may output a visual representation of the weighted phrases to the computing device 104 for presentation to the user 102 via the display 116.

Once the processed phrases are weighted by the scoring module 132, the collection component 216 may compile the weighted phrases into a single file or a location stored in the memory 122. Subsequently, the ranking module 218 may rank the weighted phrases based at least in part on the weights assigned to each phrase. For instance, the ranking module 218 may rank the phrases in a hierarchical manner, meaning that the phrases with the highest weights are ranked first and the phrases with the lowest weights are ranked last. Alternatively, the ranking module 218 may rank the phrases in any manner and based on any characteristic or attribute associated with the phrases. Moreover, upon the weighted phrases being ranked, the display module 220 may create a visual representation of the ranked phrases. In various embodiments, the visual representation may include a representation of each phrase (e.g., by text, images, symbols, etc.) that varies based on the weight assigned to each phrase. For instance, various characteristics of each phrase, such as font, color, size, etc., may be emphasized or deemphasized to indicate the relative frequency associated with each phrase. In these embodiments, the visual representation of the phrases for a particular point in time may be output to the computing device 104. Moreover, the visual representation may be constantly or periodically updated either at the phrase analysis server 110 and/or at the computing device 104 as additional phrases are extracted, filtered, processed, and weighted.

Providing Phrase Data

Figure 3:
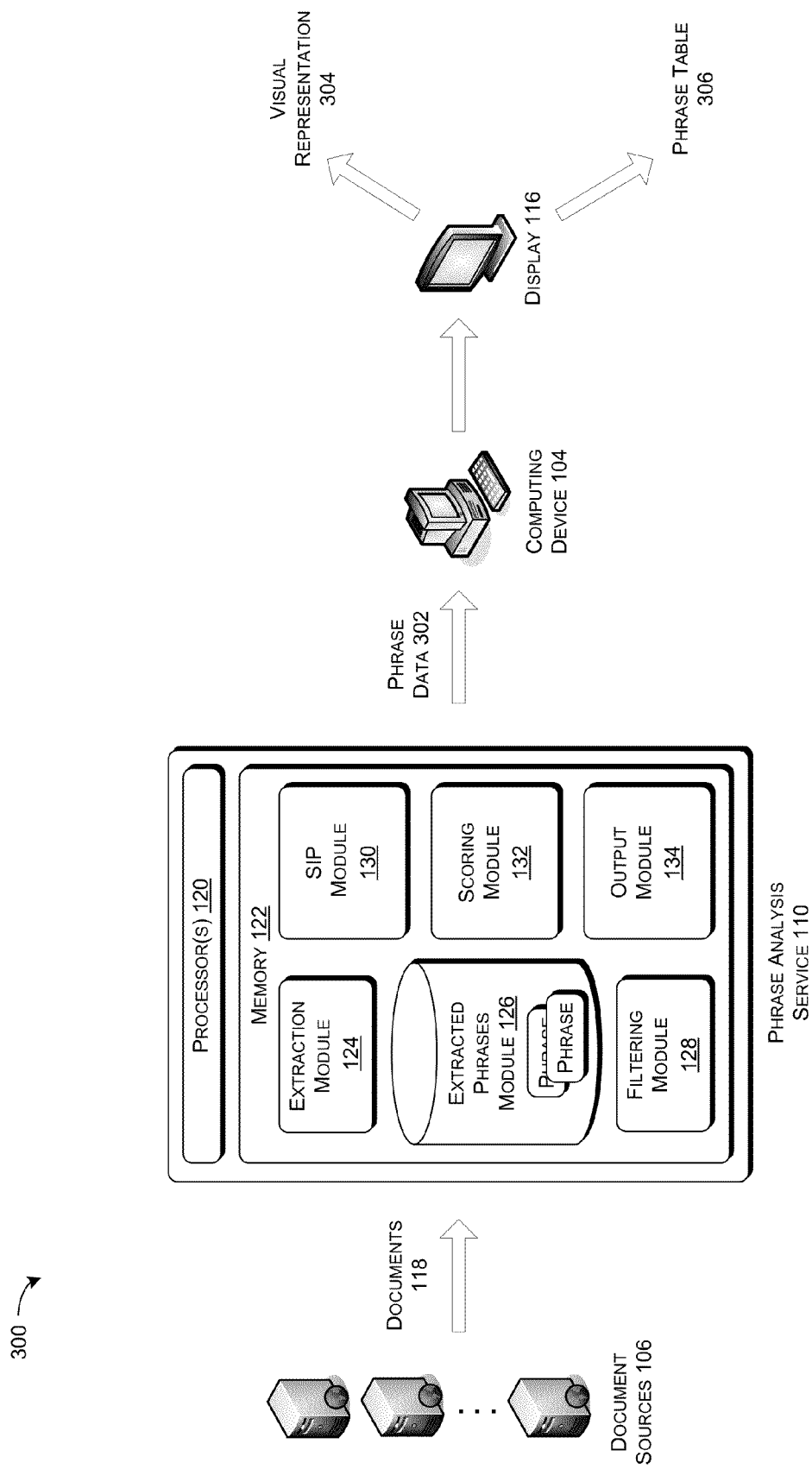
FIG. 3 is a diagram showing an example process of processing phrases extracted from documents and outputting a visual representation of the phrases to a computing device.

FIG. 3 illustrates a diagram representing a system 300 for providing a visual representation of phrases extracted from one or more document sources based at least in part on a relative frequency of each of the phrases. In various embodiments, the system 300 includes the document sources 106, the phrase analysis service 110, the computing device 104, and the display 116 that is associated with the computing device 104. Moreover, as shown in FIG. 3, the phrase analysis service 110 includes the one or more processor(s) 120 and the memory 122, which includes the extraction module 124, the extracted phrases module 126, the filtering module 128, the SIP module 130, the scoring module 132, and the output module 134. In these embodiments, the system 300 represents the process of extracting phrases within documents 118 from the one or more documents sources 106 and ultimately providing a visual representation 304 and/or a phrase table 306 to the user 102, which both indicate current trends identified in the document sources 106.

Initially, the document sources 106 (e.g., blogs, news sites, social media sites/networks, etc.) may generate, store, and/or provide access to a plurality of the documents 118 (e.g., blog posts, news articles, e-mail messages, etc.). Moreover, the extraction module 124 of the phrase analysis service 110 may extract one or more phrases from the documents 118. In various embodiments, the phrases may include any number of words, characters, symbols, etc., and may relate to or describe the documents 118 in which they are extracted. In various embodiments, the extracted phrases may be stored in the extracted phrases module 126 to prior to processing by the phrase analysis service 110. In particular, the extracted phrases may then be filtered by the filtering module 128, which may utilize one or more rules to reduce the number of extracted phrases. That is, the filtering module 126 may filter out certain phrases that have a lower likelihood of representing the actual content of and/or topics associated with the document 118 in which the phrase was extracted. In various embodiments, the filtering process may be based on one or more dictionaries, the number of words in the phrase, the number of characters in at least one word in the phrase, and/or the presence of stop phrases or stop words in the phrase, as described above with respect to FIG. 2.

Once the phrases have been filtered (e.g., reduced in number), the SIP module 130 may determine whether each of the filtered phrases are SIPs. Moreover, the SIP module 130 may determine the frequency in which those phrases appear in the documents 118 and may also determine the number of different document sources 106 in which each phrase appears. In various embodiments, the scoring module 132 may then assign a weight to each SIP phrase based at least in part on the frequencies determined by the SIP module 130. For instance, a phrase that appears more frequently in the documents 118 and/or appears in a greater number of different document sources 106 may be assigned a higher weight than other phrases that appear less frequently.

At this point, the output module 134 may collect the weighted phrases, rank the weighted phrases based at least in part on their respective weights, and assemble the weighted data into phrase data 302. In some embodiments the phrase data 302 may include a visual representation 304 of the phrases and/or a phrase table 306 that includes various information associated with each phrase. For instance, for each phrase, the phrase table 306 may include an identity of the phrase, a weight assigned to that phrase, and the corresponding frequencies determined by the SIP module 130. The visual representation 304 and/or the phrase table 306 may be formulated and output by the output module 134. In other embodiments, the phrase data 302 may include the ranked phrase data but the computing device 104 may create the visual representation 304 and/or the phrase table 306 for presentation to the user 102. In any event, the phrase data 302 is output to the computing device 104, which presents the visual representation 304 and/or the phrase table 306 to the user 102 via the display 116. The visual representation 304 and the phrase table 306 will be discussed in additional detail in FIG. 5.

Phrase Extraction

Figure 4:
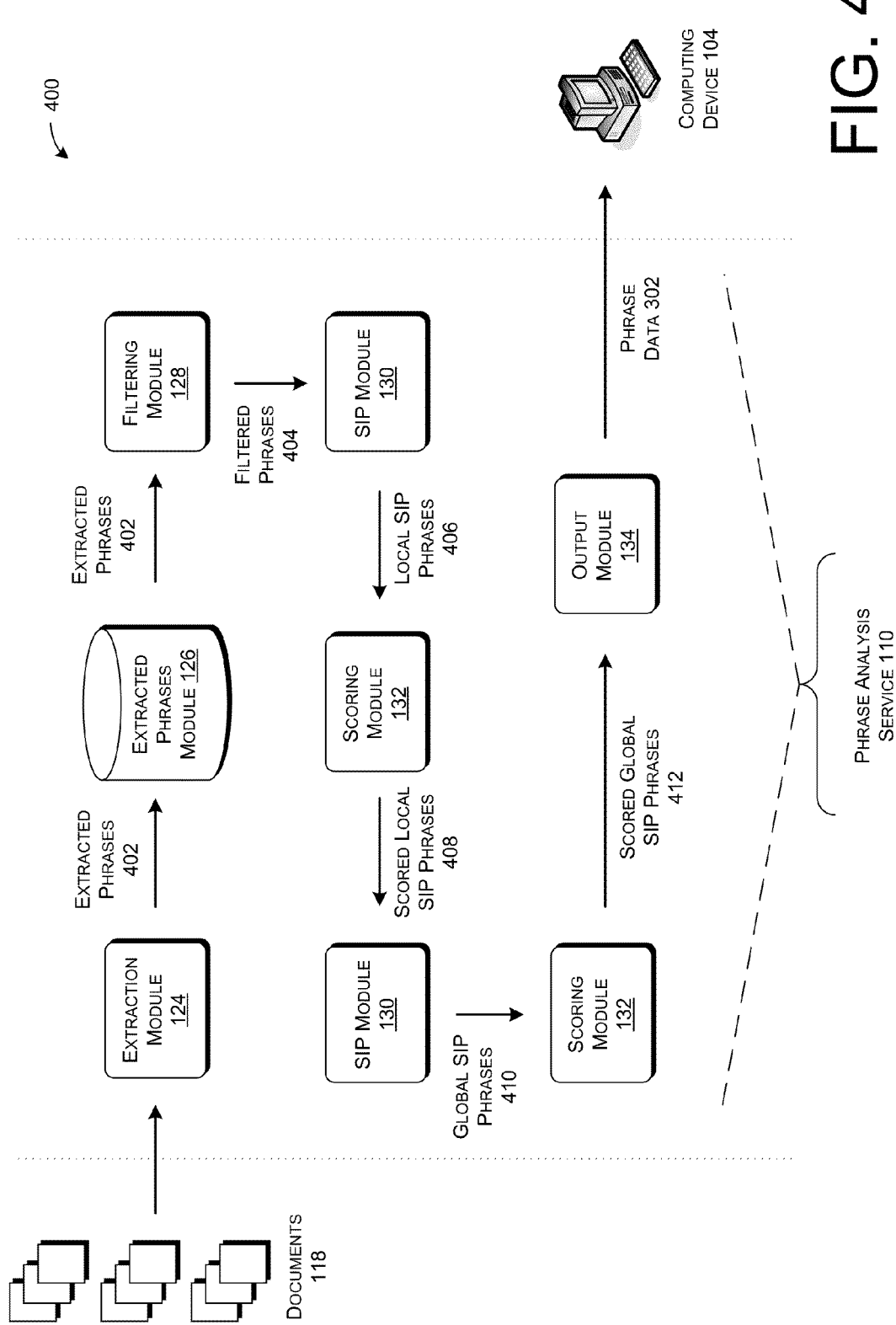
FIG. 4 is a diagram showing an example process of extracting, filtering, and scoring phrases identified in one or more documents and outputting the phrases to a computing device.

FIG. 4 illustrates a diagram representing a system 400 for processing extracted phrases and presenting the processed phrase data to a user. More particularly, FIG. 4 illustrates the processing of phrases performed by the phrase analysis service 110. In various embodiments, the phrase analysis service 110 may be able to access one or more documents 118 from one or more document sources 106. From these documents 118, the extraction module 124 may extract phrases (e.g., extracted phrases 402) that may be stored in the extracted phrases module 126. The extracted phrases 402 may be any type of phrase that includes any type and/or number of words or characters. Moreover, the extracted phrases 402 may or may not represent topics and/or content associated with the documents 118 in which they were extracted.

As shown, the extracted phrases 402 may then be filtered by the filtering module 128, resulting in a subset of filtered phrases 404. In some embodiments, the filtering module 128 may utilize one or more rules in order to eliminate the extracted phrases 402 that are less likely to represent topics and/or content associated with the documents 118. For instance, the filtering module 128 may reduce the number of extracted phrases 402 based at least in part on whether at least one word within the phrase is included in a dictionary, the number of words within the phrase, the number of characters of at least one word within the phrase, the presence of stop phrases or stop words within the phrase, and/or any other factor that may help ensure that the phrases relate to meaningful content.

In further embodiments, the resulting filtered phrases 404 may then be processed by the SIP module 130. More particularly, for each filtered phrase 404, the SIP module 130 may determine the frequency that each filtered phrase 404 appears in the document 118 in which it was extracted, in comparison to the other documents 118. That is, the SIP module 130 may determine whether each filtered phrase 404 occurs in a higher concentration with respect to its corresponding document 118 as opposed to the remaining documents 118. For those filtered phrases 404 that are determined to be SIPs (e.g., local SIP phrases 406), those SIP phrases may be weighted or scored by the scoring module 132. These SIP phrases may be referred to as local SIP phrases 406 since they may be considered SIPs with respect to the document 118 in which they were extracted. Furthermore, the scoring module 132 may assign a weight to the local SIP phrases 406 in any manner, such as by assigning a higher weight to the local SIP phrases 406 based on their respective frequency within the document 118 in which they were extracted. For instance, more frequently occurring local SIP phrases 406 may be assigned a weight or scored higher than less frequently occurring local SIP phrases 406. Once the local SIP phrases 406 are weighted or scored by the scoring module, they may be referred to as scored local SIP phrases 408.

In some embodiments, the scored local SIP phrases 408 may be processed by the SIP module 130 to generate global SIP phrases 410. More particularly, for each of the scored local SIP phrases 408, the SIP module 130 may determine the number of document sources 106 (e.g., news sites, blogs, e-mail providers, etc.) in which the scored local SIP phrases 408 occur. Therefore, not only may the SIP module 130 determine the frequency of the phrases relative to other documents 118, but the SIP module 130 may also determine whether, and to what extent, the phrases appear in different document sources 106. Alternatively, as opposed to the SIP module 130 processing the scored local SIP phrases 408, the SIP module 130 may also process the filtered phrases 404 in a similar manner. That is, for each filtered phrase 404, the SIP module 130 may determine the number of document sources 106 in which those filtered phrases 404 occur. The resulting global SIP phrases 410 are considered global since the calculated frequency relates to a number of different document sources 106 in which those phrases are present.

Subsequently, the global SIP phrases 410 may be assigned a weight or scored by the scoring module 132, resulting in scored global SIP phrases 412. As mentioned above, the weight associated to each global SIP phrase 410 may be based in part on the relative frequencies determined by the SIP module 130. Furthermore, the scored global SIP phrases 412 may be collected, ranked, and output by the output module 134. In particular, the scored global SIP phrases 412 may be ranked based on their respective frequencies and the ranked phrases may be depicted as a visual representation 304 of the phrases and/or a phrase table 306 that includes information about each phrase. The visual representation 304 and/or the phrase table 306 may be output by the output module 134 as the phrase data 302. Moreover, the phrase data 302 may then be presented to the user 102 via the display 116 of the computing device 104.

Visual Representation of Phrase Data

Figure 5:
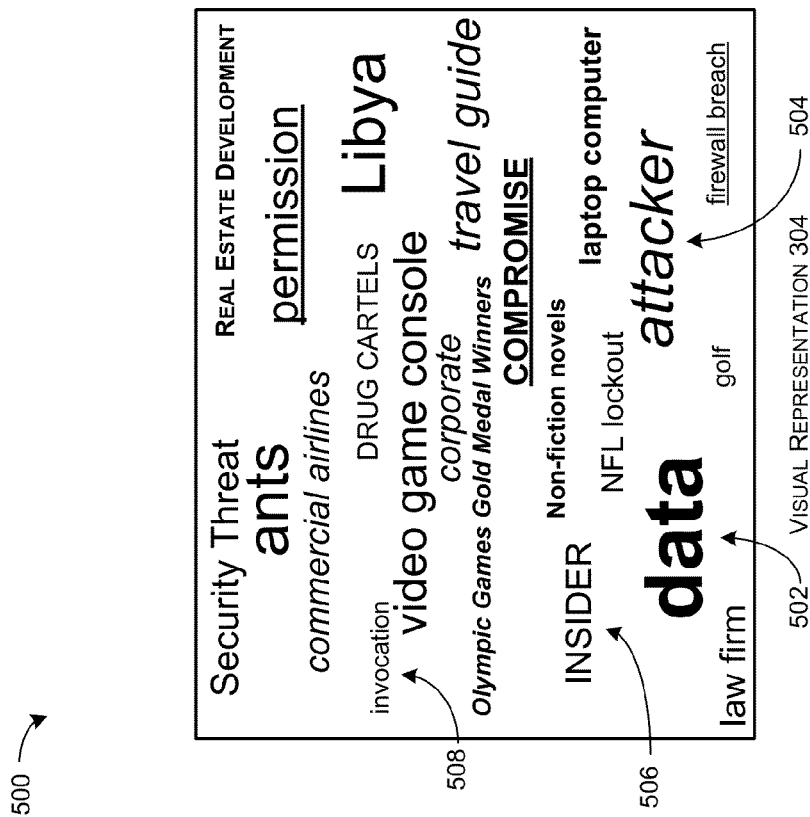
FIG. 5 is a diagram showing a visual representation of phrases that are extracted from one or more documents originating from one or more document sources.

FIG. 5 illustrates a diagram representing a user interface 500 that may be presented to the user 102 via the display 116 of the computing device 104. More particularly, the phrases that are extracted, filtered, processed (by the SIP module 130), and weighted by the phrase analysis service 110 may be presented to the user 102 as the visual representation 304 and/or the phrase table 302. The visual representation 304 of the phrases may include a representation of each of the phrases that appear in the documents 118. Moreover, the representation of each phrase may vary based at least in part on the weight assigned to each phrase, meaning that the phrases may be represented based on a frequency in which they appear in the documents 118 and/or a number of document sources 106 in which the phrases appear.

In various embodiments, the phrases may be represented by text (e.g., words, characters, etc.), symbols, images, or any other means. Furthermore, the representation of the phrases may be emphasized or deemphasized in any manner, such as by increasing/decreasing the size, changing the colors, and/or adjusting the font of the phrase representations. The visual representation 304 and/or the phrase table 306 may also be presented to the user in multiple ways, such as by presenting the information in a web browser on the display 116.

In the example embodiments illustrated in FIG. 5, the visual representation 304 includes the text of a plurality of phrases. In these embodiments, the phrases may have been extracted, filtered, processed, and/or scored utilizing the techniques set forth herein. Moreover, the size of the text of the phrases may be varied, which may indicate that some phrases appeared more frequently in the documents 118 than other phrases. That is, the text size of the phrases may indicate a frequency of the phrases across all of the documents 118, whereby larger text may represent phrases that have appeared more frequently in the documents 118.

In the above embodiments, the visual representation 304 includes multiple phrases including data 502, attacker 504, insider 506, and invocation 508, among others. As shown the phrase data 502 appears to have the largest text, followed by attacker 504, insider 506, and invocation 508. In these embodiments, the larger text size associated with the phrase data 502 may indicate that this term appeared more frequently in the documents 118 relative to the phrases attacker 504, insider 506, and invocation 508. Further, due to the sizes of each phrase, the phrase attacker 504 may have appeared more frequently in the documents 118 than the phrases insider 506 and invocation 504, but less frequently than the phrase data 502. As a result, by viewing the text size of these phrases in the visual representation 304, the user 102 may determine which phrases are appearing more frequently in the documents 118 at a particular point in time. Although text size is used to highlight the frequency of the phrases, any method of emphasizing the phrases may be utilized (e.g., changing fonts, colors, etc.).

In addition, the visual representation 304 may indicate to the user 102 that certain phrases appear in documents 118 from multiple document sources 106 whereas other phrases appear only within a single document source 106. Although not shown in the visual representation 304, the color assigned to the phrases may indicate the number of different document sources 106 in which those phrases appear. For instance, the brightness of colors associated with the text of the phrases may correspond to the number of document sources 106 in which those phrases are found. That is, a first phrase that appear in multiple document sources 106 may have a bright color, such as bright red, yellow, or orange, whereas as second phrase that appears in a single document source 106 may be represented in a darker color, such as black or brown. Moreover, a third phrase that appears in a number of document sources 106 that is between the first and the second phrases may be assigned an intermediate color, such as blue or green. As stated above, although colors may be used to highlight the number of document sources 106 in which the phrases appear, this may also be represented in any manner, such as by varying the size or font of the phrases, or utilizing upper case letters, lower case letters, and/or a combination thereof. Moreover, the orientation of the representations of the phrases within the visual representation 304 may also indicate frequencies of the phrases within the documents 118 and/or the document sources 106. For instance, the phrases may appear vertically, horizontally, diagonally, and/or at any other angle within the visual representation 304.

Provided that the phrases depicted in the visual representation 304 are emphasized in the manner set forth above, a phrase that appeared many times in the documents 118 and also appeared in a great number of document sources 106 may have a larger text size that is displayed in a bright color. On the contrary, a phrase that appeared a limited number of times in the documents 118 and only appeared in a single document source 106 may be represented by small text and a darker color. Furthermore, a phrase that appeared very frequently in the documents 118 but appeared in a relatively low number of document sources 106 would likely have a larger text size, but would be displayed in a darker color. Lastly, a phrase that appeared only several times in the documents 118 but appeared in multiple different document sources 106 would likely be represented by small text in a brighter color.

In various embodiments, the visual representation 304 may indicate to the user the frequency in which phrases are being mentioned and/or discussed in various documents and/or the number of different information sources in which those phrases are appearing at a particular point in time. That is, at any particular time, the visual representation 304 provides a snapshot of what phrases are trending and, based on the representation of these phrases, the user 102 may be able to determine topics and/or content that are currently being mentioned on a more frequent basis across multiple information sources. However, the visual representation 304 may also be periodically or dynamically updated based on the availability of more recently accessible documents 118. For instance, new phrases and additional instances of existing phrases may be extracted, processed, and weighted by the phrase analysis service 110. As this occurs, the new phrases may be added to the visual representation and the existing phrases may be adjusted based on their updated frequency within the documents 118 and among the different document sources 106.

Therefore, if a representation of a particular phrase within the visual representation 304 is modified, the user 102 may determine that the appearance of this phrase is becoming more or less frequent. Since the phrase analysis service 110 may be able to immediately and dynamically highlight changes in the representation of the phrases, the user 102 may choose to examine documents 118 associated with the changing phrases to examine why such changes are occurring. Furthermore, as additional documents 118 become available, the visual representation 304 of the phrases may continue to change to illustrate what phrases are trending at that particular time.

In additional embodiments, the phrase table 306 may also be presented to the user 102, either independently or in conjunction with the visual representation 304. The phrase table 306 may include data associated with the phrases illustrated in the visual representation 304. Although the phrase table 306 may include any type of information associated with these phrases, the phrase table 306 shown in FIG. 5 includes a score 510, a phrase 512, a frequency 514, and document sources 516. That is, for each phrase shown in the representation table 304, the phrase table 306 sets forth the score (or weight) assigned to the phrase (e.g. the score 510), the identity of the phrase (e.g., the phrase 512), the frequency in which the phrase appears in the documents 118 (e.g., the frequency 514), and the number of different document sources 106 in which the phrase was present (e.g., the document sources 516). Therefore, instead of illustrating representations of the phrases, the phrase table 306 may show the actual data associated with each phrase included within the visual representation 304.

In various embodiments, the phrases illustrated in the visual representation 304 and the phrase table 306 may remain without being deleted. Although phrases that have been existing in the visual representation 304 for long periods of time may tend to have higher frequencies, as newer phrases appear more frequently in documents 118 and/or different document sources 106, the frequency of those newer phrases may eventually surpass the older, existing phrases. As a result, the weight assigned to the newer phrases may also exceed the weight associated with the older, existing phrases. An advantage of maintaining the phrases in the visual representation 304 is that, over time, the visual representation 304 and the corresponding phrase table 306 may constitute an archive that describes what phrases were trending at different times. For instance, a user 102 may be interested in determining which phrases were trending and, therefore, which topics and/or content was being mentioned or discussed at a particular time in the past. Since this data remains, the user 102 may be able to search for a particular time period and access the visual representation 304 associated with that time. In other embodiments, both a current visual representation 304 and an archived visual representation 304 may be maintained for this purpose. As a result, the user 102 may have access to currently trending phrases and/or phrases that were trending at a specific time period in the past but no longer frequently appear in the documents 118.

Moreover, the visual representation 304 and the phrases associated therewith may also be manipulated based on time. For instance, the weights assigned to the phrases may be degraded or decreased over time in order to prevent recent frequently appearing phrases to be overshadowed by phrases that used to appear frequently but do not presently occur as frequently. Otherwise, since older phrases are likely to have appeared a relatively large amount over time, their respective scores may be quite large. Therefore, it may take a significant amount of time for a newer phrase to attain a weight that actually surpasses the older phrases. By degrading the weights of the phrases over time, newer phrases that are currently appearing very frequently may be displayed as such in the visual representation 304.

In other embodiments, newer and/or more frequently appearing phrases may be weighted more heavily in order to emphasize that these phrases are currently becoming important and/or more relevant. In different embodiments, phrases that have become more frequent in a short period of time but that do not surpass the weights assigned to phrases that have been trending for a significant amount of time may be highlighted and/or emphasized in the visual representation 304. That way, the user 102 may be able to determine that these newer phrases are actually more relevant than the older phrases at this particular point in time.

Furthermore, the user 102 may be able to configure the visual representation 304 based on his or her preferences. For instance, the visual representation 304 may be customized by the user 102 such that the visual representation 304 either includes or excludes certain document sources 106. That is, the user 102 may desire to view phrases appearing in news articles and blogs, but not social media sites or networks. Moreover, the user 102 may customize the visual representation such that the phrases displayed therein relate to a specific geographic location, demographic, or any other factor.

Example Processes

Figure 6:
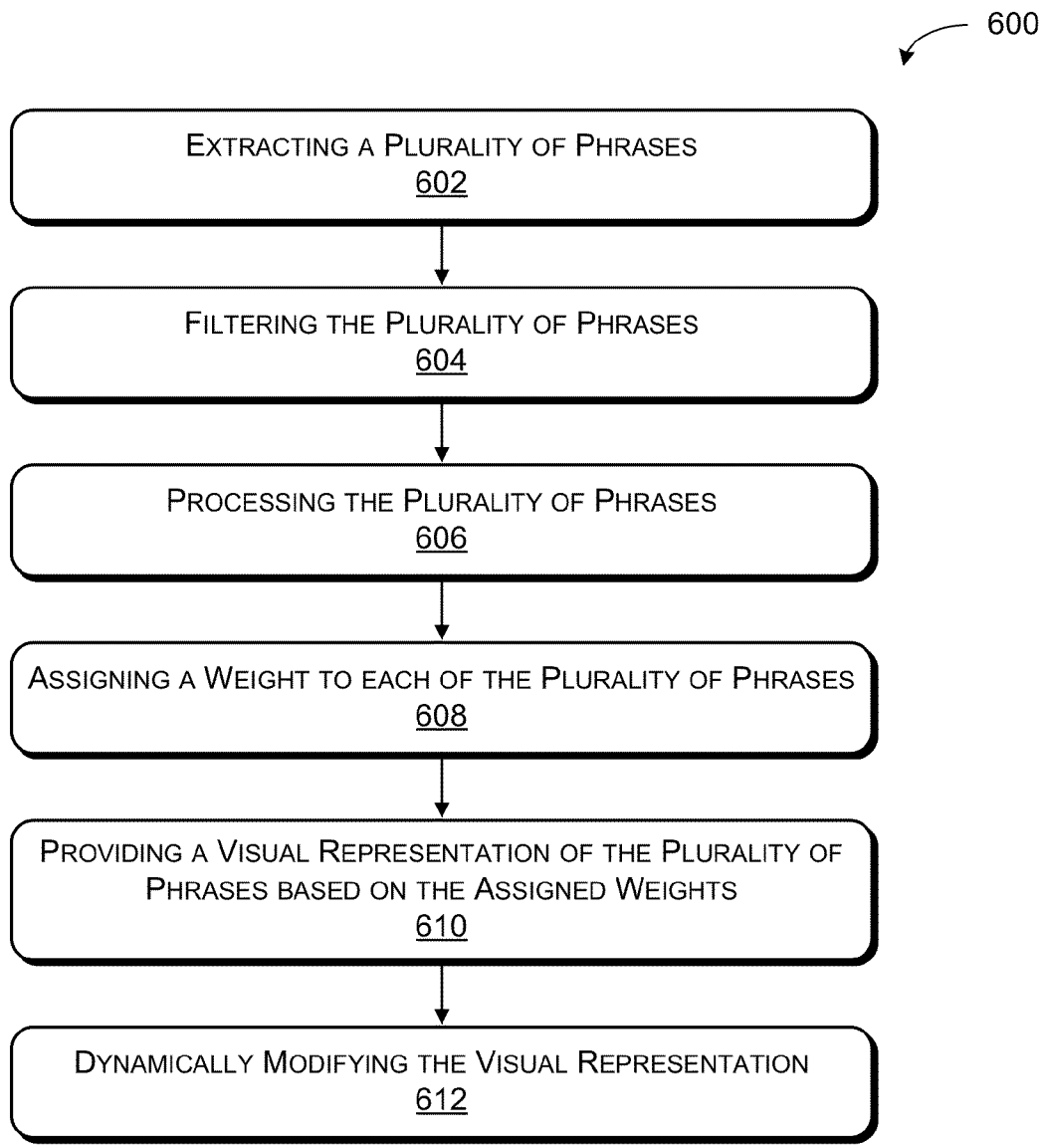
FIG. 6 is a flow diagram showing an example process of visually representing a plurality of phrases extracted from documents associated with one or more document sources.
Figure 7:
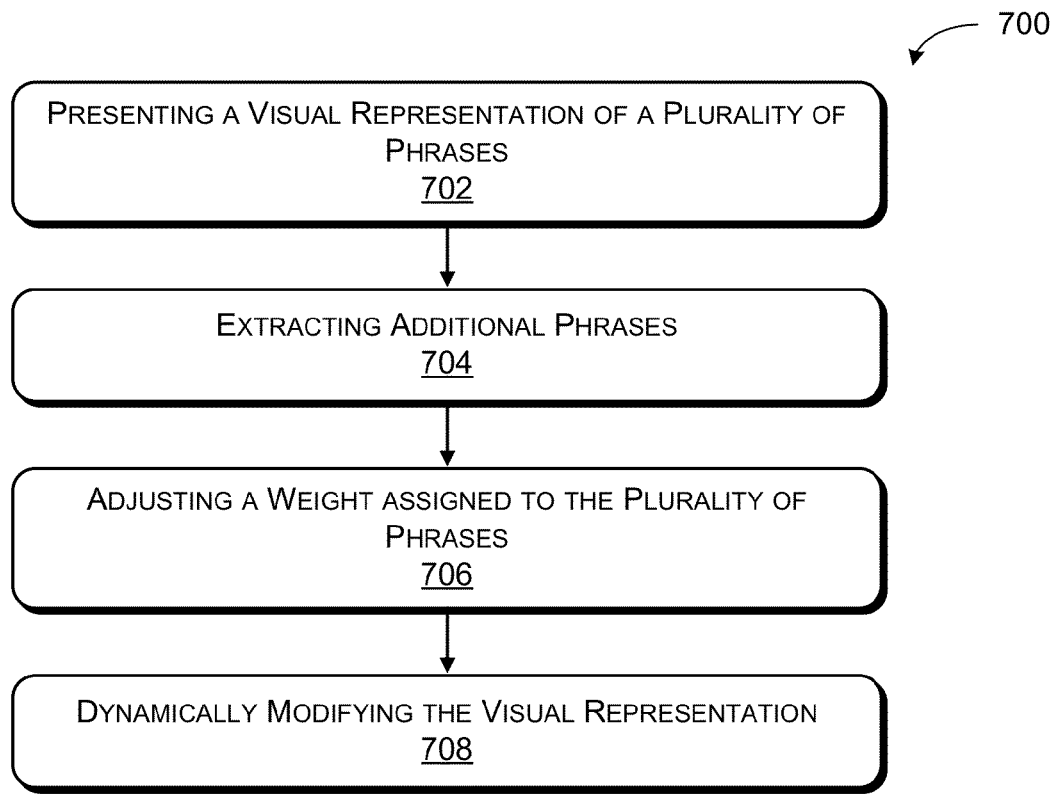
FIG. 7 is a flow diagram showing an example process of modifying a visual representation of phrases extracted from documents associated with one or more document sources.

FIGS. 6 and 7 describe various example processes of visually representing one or more phrases based at least in part on the respective frequency that the phrases appear in the documents in which they are extracted. The example processes are described in the context of the environment of FIGS. 1-5 but are not limited to those environments. The order in which the operations are described in each example method is not intended to be construed as a limitation, and any number of the described blocks can be combined in any order and/or in parallel to implement each method. Moreover, the blocks in FIGS. 6 and 7 may be operations that can be implemented in hardware, software, or a combination thereof. In the context of software, the blocks represent computer-executable instructions stored in one or more computer-readable storage media that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 6 is a flow diagram illustrating an example process of visually representing a plurality of phrases that were extracted from documents associated with one or more document sources. Moreover, the following actions described with respect to FIG. 6 may be performed by a server and/or the phrase analysis service 110, as shown in FIGS. 1-5.

Block 602 illustrates extracting a plurality of phrases. More particularly, the extraction module 124 of the phrase analysis service 110 may extract phrases from multiple documents 118 that correspond to multiple different sources of information. For instance, the documents 118 may include e-mail messages, blog posts, news articles, any posts or comments associated with social media sites or networks (e.g., Facebook®, Twitter®, etc.), and/or any other type of natural language document 118. Moreover, document sources 106 may be the source(s) of such documents 118, such as an origin of the documents 118 or a location of where the documents 118 are accessible. Moreover, the phrases may include any number of words and/or characters and may include nouns, verbs, adjectives, or any other type of language, that may reference a topic or content associated with the document 118 in which the phrase is extracted.

Block 604 illustrates filtering the plurality of phrases. In particular, the extracted plurality of phrases may be filtered (e.g., by the filtering module 128) to eliminate phrases that are not likely to reflect topics or content associated with the documents 118. In some embodiments, the plurality of phrases may be filtered based on any characteristic associated with the phrases. For instance, the plurality of phrases may be filtered based at least in part on whether any words in the phrases are included in a dictionary having a predetermined number of words, the amount of words in the phrases, the amount of characters in any word included within the phrases, and the existence of any stop phrases or stop words included in the phrases. As a result, based on whether a particular phrase falls into one of the foregoing categories, the phrase may be eliminated or maintained for further processing.

Block 606 illustrates processing the plurality of phrases. In some embodiments the plurality of phrases that have not been filtered out may be processed (e.g., by the SIP module 130) by determining whether each phrase is a SIP. Furthermore, each may phrase may be processed to determine a frequency in which the phrases appear in the documents 118 and/or a number of the document sources 106 in which each phrase is present. That is, the plurality of phrases may be processed to determine the extent to which these phrases are being mentioned and/or discussed amongst various information sources.

Block 608 illustrates assigning a weight to each of the plurality of phrases. In various embodiments a weight or score may be assigned (e.g., by the scoring module 132) based at least in part on the frequency in which the phrases appear in the documents 118 and/or a number of the document sources 106 in which each phrase is present. For instance, phrases that appear more frequently in the documents 118 and/or phrases that appear in a greater number of document sources 106 may be assigned higher weights. Once the plurality of phrases are weighted, they may be collected, ranked, and output (e.g., by the output module 134). Moreover, the plurality of phrases may also be assembled into a visual representation 304 that may be provided to the computing device 104 for presentation to the user 102 via the display 116.

Block 610 illustrates providing a visual representation of the plurality of phrases based at least in part on the assigned weights. In particular, the visual representation 304 may include representations of the plurality of phrases, such as the text of the phrases or symbols, images, or characters associated with the phrases. Moreover the representation of each phrase may vary, such as by varying any characteristic associated with the representation (e.g., size, color, shape, font, etc.). As stated above with respect to FIG. 5, the varying representations of the phrases may be based on the respective assigned weights and the frequency with which the phrases occur in the documents 118 and/or the document sources 106. As a result, by viewing the visual representation 304, the user 102 may determine which phrases are being more commonly referenced and/or discussed at any particular point in time.

Block 612 illustrates dynamically modifying the visual representation. In various embodiments, the representations of the phrases within the visual representation 304 may be dynamically modified as additional phrases are extracted, processed, and weighted. For instance, as additional instances of existing phrases and new phrases are extracted, the representations of the phrases may be modified to indicate changes in frequency of the phrases in the documents 118 and/or the document sources 106. As a result, after the visual representation 304 is modified, the user 102 may then view which phrases are currently trending (e.g., being mentioned and/or discussed more frequently across the multiple information sources). In some embodiments, if a user 102 determines that phrase of interest to the user 102 is increasing in frequency, the user 102 may access the documents 118 in which that phrase appears to determine the context of why the phrase is being utilized.

FIG. 7 is a flow diagram illustrating an example process of presenting a visual representation of phrases extracted from documents and making modifications thereof. In various embodiments, the operations illustrated in FIG. 7 may be performed by a server or the phrase analysis service 110, as illustrated in FIGS. 1-5.

Block 702 illustrates presenting a visual representation of a plurality of phrases. In some embodiments, upon extracting phrases from the documents 118 associated with one or more document sources 106 (e.g., by the extraction module 124), filtering the phrases (e.g., by the filtering module 128), processing the phrases (e.g., by the SIP module 130), and assigning a weight to the phrases (e.g., by the scoring module 132), the phrases may be transmitted to the computing device 104 and presented to the user 102 as a visual representation 304. As stated above, in the visual representation 304, each phrase included therein may be represented in a manner (e.g., changes in size, color, shape, font, etc.) that indicates a current frequency in which those phrases are occurring in the documents 118 and/or the multiple document sources 106.

Block 704 illustrates extracting additional phrases. More particularly, the phrase analysis service 110, and the extraction module 124 in particular, may monitor (either continuously or periodically) the document sources 106 for newly provided documents 118. From these documents 118, additional phrases may be extracted. These phrases may include additional instances of existing phrases already included in the visually represented phrases and/or new phrases that have yet to be processed. Once these phrases are identified, they then may be filtered, processed, and weighted by the various components of the phrase analysis service 110.

Block 706 illustrates adjusting a weight assigned to the plurality of phrases. Based on the frequency in which the phrases now appear in the documents 118, the weight assigned to the phrases may be adjusted. For instance, phrases that currently appear more frequently in the documents 118 may have their corresponding weights be increased. Moreover, the weights of existing phrases that have the same frequency as previously may remain the same. Therefore, the weights of the phrases may be adjusted based on their overall frequency in the documents 118 and among the different document sources 106.

Block 708 illustrates dynamically modifying the visual representation. More particularly, based on the weight adjustments, the visual representation 304 of various phrases may be modified. For instance, a representation for a phrase that now appears more frequently in the documents 118 and/or the number of document sources 106 may be modified to reflect this, such as by increasing a size, changing a color, changing a shape, and/or changing a font of that particular phrase. By viewing the visual representation 304, the user 102 may readily determine which phrases are appearing more frequently in the documents 118 and various information sources and take any action in response thereto.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors;
memory, accessible by the one or more processors; and
a phrase analysis service stored in the memory and executed on the one or more processors to:
  extract a plurality of phrases from documents associated with one or more document sources;
  filter the plurality of phrases to exclude one or more of the plurality of phrases that are non-representative of a topic of documents from which the one or more phrases were extracted;
  analyze the filtered plurality of phrases to determine a frequency in which individual phrases of the plurality of phrases appear in the documents and a number of the one or more document sources in which the individual phrases appear;
  assign, based at least in part on the analyzing, a weight to the individual phrases;
  provide a visual representation of the plurality of phrases based at least in part on assigned weights; and
  dynamically modify the visual representation of the plurality of phrases as additional phrases become available such that the visual representation represents a current frequency in which the individual phrases appear in the documents and the document sources.

2. The system as recited in claim 1, wherein the phrase analysis service further provides a phrase table that includes, for the individual phrases, the assigned weight, the frequency associated with the documents, and the number of document sources that the individual phrases appear.

3. The system as recited in claim 1, wherein the visual representation is dynamically modified by changing a representation of at least one of the plurality of phrases.

4. The system as recited in claim 3, wherein the representation of the at least one phrase is changed by varying a size, a color, a shape, or a font of the representation of the at least one phrase.

5. The system as recited in claim 1, wherein the document sources include human created content or social media.

6. The system as recited in claim 1, wherein the phrase analysis service:
  periodically monitors the one or more document sources to determine an existence of one or more new documents; and
  in response to determining that the one or more new documents are identified, extracts additional phrases from the one or more new documents.

7. The system as recited in claim 6, wherein the additional phrases include additional instances of the plurality of phrases or new phrases not included in the plurality of phrases.

8. One or more non-transitory computer-readable media storing computer-executable instructions that, when executed by one or more processors, cause the one or more processors to perform operations comprising:
  extracting a plurality of phrases from documents associated with one or more document sources;
  filtering the plurality of phrases to:
    identify a portion of the plurality of phrases that do not relate to content or a topic of documents in which the portion of the plurality of phrases were extracted; and
    remove the portion of the plurality of phrases;
  analyzing the filtered plurality of phrases to determine a frequency in which the filtered plurality of phrases appear in the documents or the one or more document sources;
  assigning a weight to the analyzed plurality of phrases; and
  outputting, based at least in part on the assigned weight, the plurality of phrases as a visual representation.

9. The one or more non-transitory computer-readable media as recited in claim 8, wherein the filtering further comprises at least one of:
  determining whether at least one word of a particular one of the plurality of phrases appears in a dictionary having a predetermined number of words;
  determining a number of words included in the particular phrase;
  determining whether at least one word of the particular phrase exceeds a predetermined number of characters; and
  determining whether at least one word of the particular phrase includes a stop word.

10. The one or more non-transitory computer-readable media as recited in claim 9, wherein the filtering further comprises removing a particular phrase from the plurality of phrases when:
  the at least one word of the particular phrase does not appear in the dictionary;
  the number of words of the particular phrase exceeds a word count;
  the at least one word of the particular phrase exceeds the predetermined number of characters; or
  the at least one word of the particular phrase includes a stop word.

11. The one or more non-transitory computer-readable media as recited in claim 8, wherein the analyzing further comprises determining whether the individual phrases are statistically improbable phrase with respect to at least one of the documents, a phrase of the plurality of phrases being a statistically improbable phrase in response to determining that the phrase appears in a first document of the documents at a higher frequency than in multiple other documents of the documents.

12. The one or more non-transitory computer-readable media as recited in claim 8, wherein the visual representation of the plurality of phrases indicates which of the plurality of documents are appearing most frequently in the document sources and which of the plurality of phrases appear in a greatest number of the document sources.

13. The one or more non-transitory computer-readable media as recited in claim 8, wherein the operations further comprise:
  extracting additional phrases from the documents associated with the one or more document sources; and
  dynamically modifying an appearance of the plurality of phrases included in the visual representation as the additional phrases are assigned a weight.

14. The one or more non-transitory computer-readable media as recited in claim 8, wherein:
  the assigned weights are degraded over time;
  more recently extracted phrases are weighted more heavily than existing phrases; or phrases that have appeared more frequently in a recent predetermined period of time are emphasized in the visual representation.

15. The one or more non-transitory computer-readable media as recited in claim 8, wherein the plurality of phrases are maintained such that the visual representation may be accessible for any particular point in time.

16. A method, comprising:
under control of one or more computer systems configured with executable instructions,
receiving a visual representation of a plurality of phrases extracted from documents associated with multiple document sources, individual phrases of the plurality phrases being individually identified in the visual representation and at least one of the plurality of phrases including two or more words; and
displaying a varying representation of the individual phrases to indicate a frequency in which the individual phrases appear in the documents and to indicate a number of the multiple document sources in which the individual phrases appear.

17. The method as recited in claim 16, further comprising modifying the varying representation of at least one of the plurality of phrases based at least in part on an updated frequency of the at least one phrase in the documents or an updated number of the multiple document sources in which the at least one phrase appears.

18. The method as recited in claim 17, wherein modifying the varying representation of at least one of the plurality of phrases includes adjusting a size, a color, a font, or an orientation of the varying representation.

19. The method as recited in claim 16, further comprising presenting, either independently or in conjunction with the visual representation, a phrase table that provides data associated with the plurality of phrases.

20. The method as recited in claim 16, wherein the varying representation of the individual phrases is based at least in part on a weight assigned to the individual phrases.

21. A method, comprising:
under control of one or more server systems configured with executable instructions,
providing a visual representation of a plurality of phrases extracted from documents associated with multiple document sources, at least one of the plurality of phrases including two or more words;
extracting additional instances of phrases included in the plurality of phrases or new phrases not included in the plurality of phrases; and
dynamically modifying, based at least in part on the extracted additional instances or the new phrases, the visual representation to indicate a number of the multiple document sources in which individual phrases of the plurality of phrases appear.

22. The method as recited in claim 21, wherein the visual representation of the plurality of phrases is based at least in part on a frequency in which the individual phrases appear in the documents or a number of the multiple document sources in which the individual phrases appear.

23. The method as recited in claim 21, further comprising:
assigning weights to the plurality of phrases or the new phrases based at least in part on a frequency in which the plurality of phrases or the new phrases occur in the documents and the number of the multiple document sources in which the plurality of phrases or the new phrases appear; and
dynamically modifying representations of the plurality of phrases or the new phrases within the visual representation based at least in part on the assigned weights.

24. The method as recited in claim 21, further comprising dynamically modifying representations of the plurality of phrases within the visual representation by changing characteristics of the representations.

25. The method as recited in claim 24, wherein dynamically modifying the representations includes modifying a size, a color, a font, or an orientation of the representations.

\* \* \* \* \*